Aug. 7, 1934.  K. E. LYMAN  1,969,698
AUTOMATIC CLUTCH
Filed Nov. 25, 1932  3 Sheets-Sheet 1
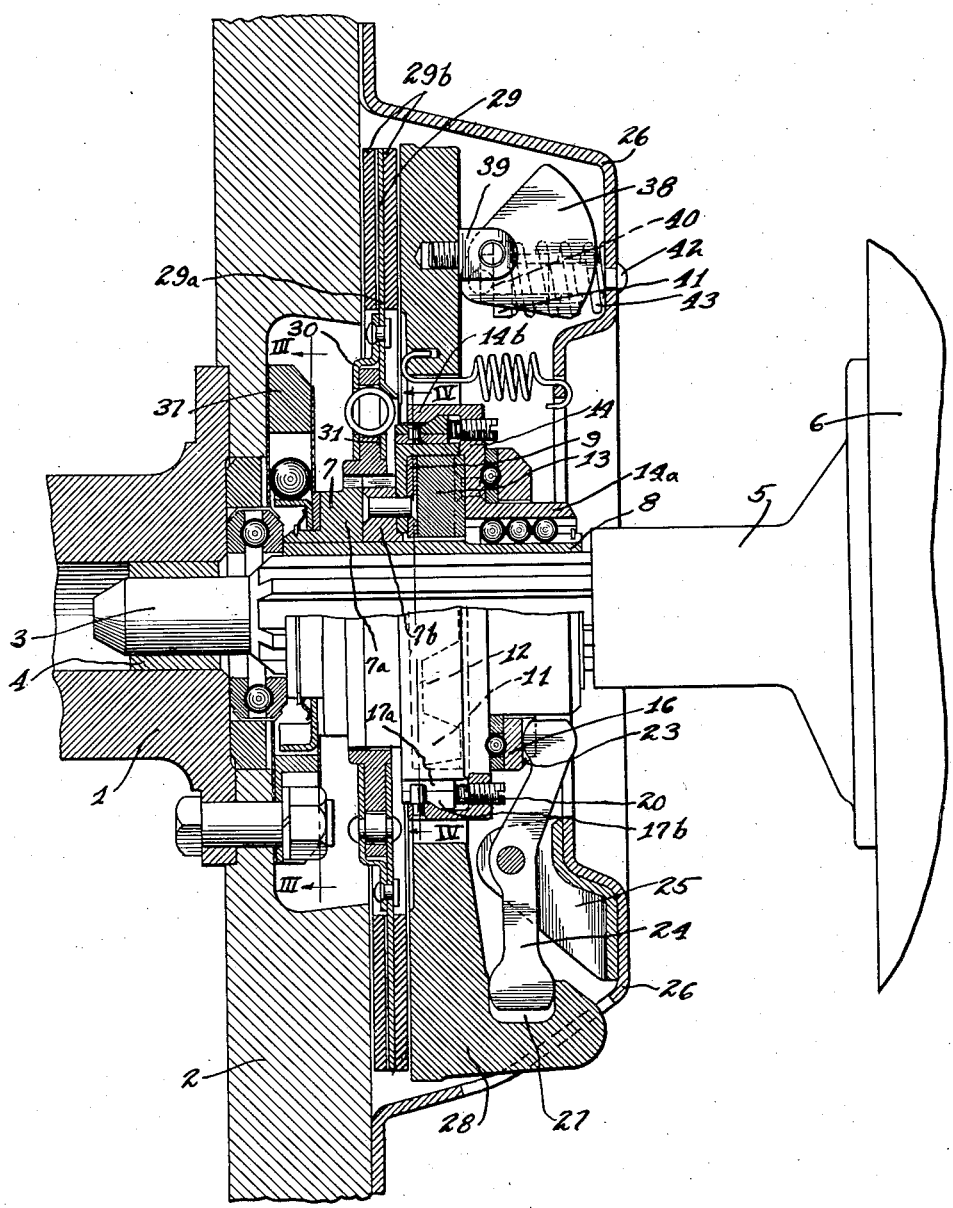
Inventor
Kenneth E. Lyman.
by Charles Hills Attys.

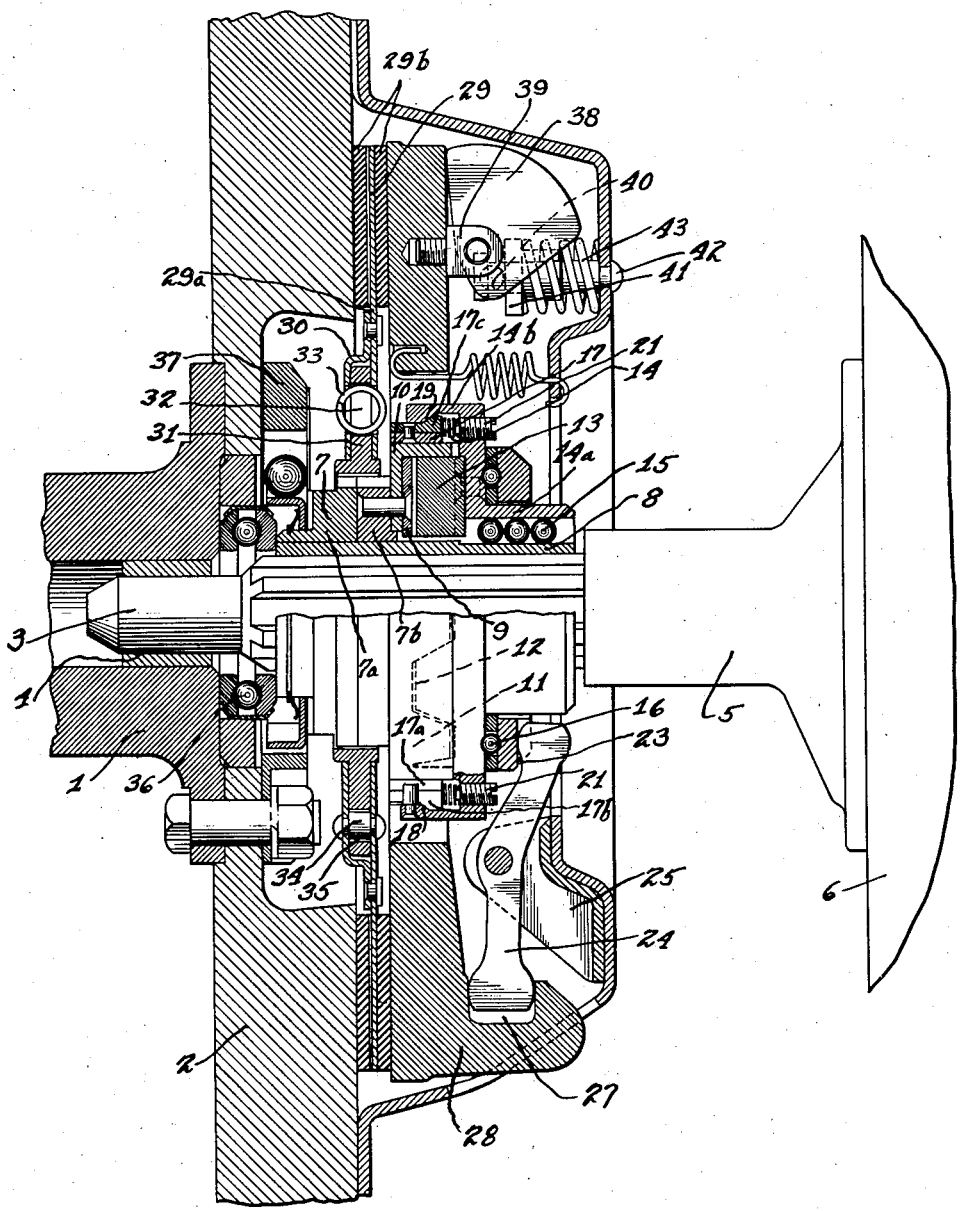

Aug. 7, 1934.   K. E. LYMAN   1,969,698
AUTOMATIC CLUTCH
Filed Nov. 25, 1932   3 Sheets-Sheet 3
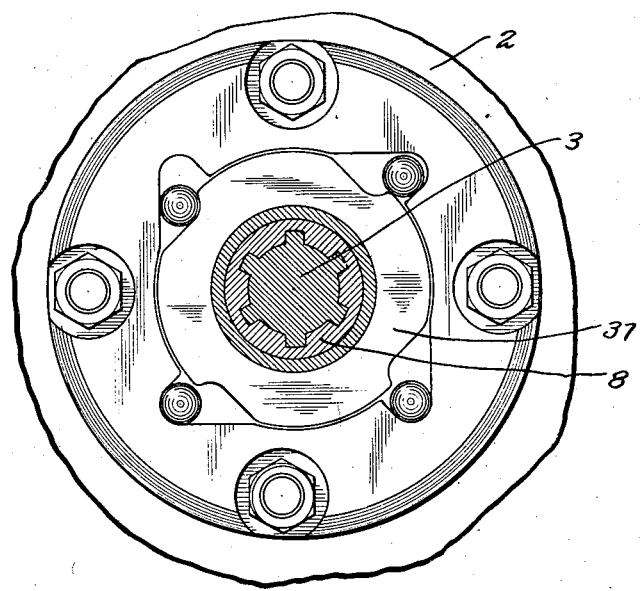
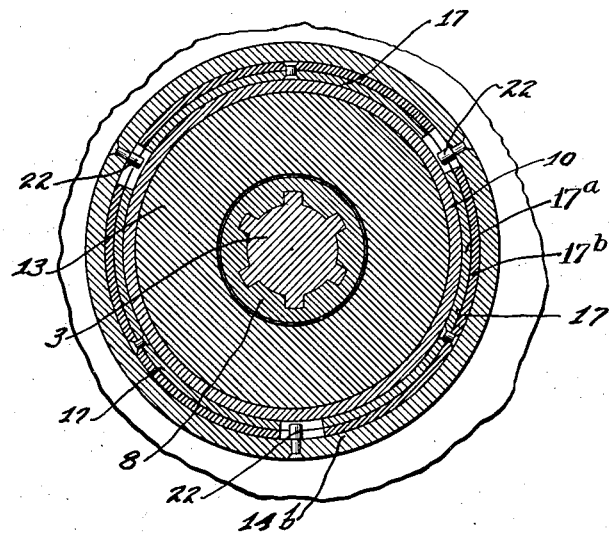

Patented Aug. 7, 1934

1,969,698

UNITED STATES PATENT OFFICE 1,969,698

AUTOMATIC CLUTCH

Kenneth E. Lyman, Rockford, Ill.

Application November 25, 1932, Serial No. 644,231

5 Claims. (Cl. 192—52)

This invention relates to an automatic friction clutch in which there are a pair of relatively shiftable members for gradually increasing the pressure applied to the clutch and concerns itself primarily with friction means between said members for preventing chatter, shocks or a quick jerky movement. In other words the friction means insures a gradual and orderly movement of the shiftable member which actuates certain mechanism for gradually increasing the pressure upon the friction clutch.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a sectional view through an automatic clutch in unclutching position involving this invention and showing parts of a transmission casing in elevation.

Figure 2 is a view similar to Figure 1 with the clutch elements engaged.

Figure 3 is an enlarged sectional view taken upon the line III—III of Figure 1, and Figure 4 is an enlarged sectional view taken upon the line IV—IV of Figure 1.

In referring to the drawings which illustrate a preferred form of the invention, the reference numeral 1 designates a driving member which is shown as the shaft of an internal combustion engine and which carries the usual fly wheel 2. A driven member 3 which may be the transmission shaft of an automotive vehicle is shown as journalled in a bearing 4 within the member 1 and in a bearing 5 attached to a transmission casing 6 or the like.

A camming member 7 is rotatably mounted upon a sleeve 8 splined upon the driven member 3. The camming member in the present instance consists of a pair of rings 7a and 7b which have a unitary operation and a cam element 9 riveted to the ring 7b. An annular angle member 10 is preferably inserted between the ring 7b and the cam element 9. The cam element 9 has cam projections 11 that cooperate with cam projections 12 upon a circular cammed element 13 that freely fits within the angle member 10.

The cammed element 13 has an annular Z-shaped ring 14 attached thereto, one flange 14a of which is splined by means of ball bearings 15 to the sleeve 8 while the other flange 14b surrounds in spaced relation the horizontal flange of the angle 10. A thrust bearing 16 abutting the web of the Z-shaped ring is carried by the flange 14a for a purpose that will later appear. The cam element 13, ring 14 and thrust bearing 16 constitute a cammed member which is longitudinally shifted to the right when the camming member 7 which includes the parts 9 and 10 rotates.

In order to control the shifting movement of the cammed member to prevent sudden shocks or jerks and to prevent chattering of the camming and cammed members, annular friction means has been inserted between such members that functions somewhat in the nature of a brake. The annular friction means consists of a plurality of ring segments 17 (Figure 4) the ends of which are spaced apart to allow for expansion. In the present instance, three segments are shown. Each segment 17 consists of a flat parti-circular element 17a and a parti-circular element 17b secured together in superposed relation. Each element 17b has an enlarged right hand edge 17c which is beveled as indicated at 18. This bevel 18 is in contact with a beveled edge 19 on the under side of the flange 14b. When the cammed member 13 is shifted toward the right, the circular segments 17 will frictionally ride over the flange of the angle 10 in the same direction. The friction engendered between the segments 17 and the flange of the angle ring 10 will prevent any quick or jerky movement of the cammed member, and will at the same time prevent chatter of the parts.

In order to maintain the beveled edges 18 and 19 in contacting relation, coil springs 20 are interposed between the friction segments 17 and the web of the annular Z member 14, and these springs may be adjusted through screws 21. Pegs 22 (Figure 4) which are attached to the flange 14b extend between the friction segments and limit any accidental rotation thereof.

The thrust bearing 16 upon the cammed member is provided with grooves or slots 23 for receiving the inner ends of levers 24 (only one of which is shown) which are pivoted intermediate their ends to lugs 25 on a casing 26 attached to the fly wheel 2. The outer ends of the levers 24 engage in sockets 27 in a circular friction plate 28. Obviously when the cammed member is shifted toward the right, the levers 24 will be actuated to force the friction plate 28 to the left to increase the pressure of the friction clutch.

Between the friction plate 28 and the fly wheel 2, there is a circular friction member 29 which consists of a central plate 29a and side plates 29b attached thereto. Upon the inner portion of the central plate 29a there is attached a plate 30 which is offset to provide a groove with said plate 29a for receiving a ring 31 splined to the rings 7a and 7b of the camming member 7. The plates 29a and 30 and the ring 31 have registering slots 32 in which coil springs 33 are positioned to yieldingly connect the friction member 29 with the camming member. In order however to hold these parts in assembled relation rivets 34 may extend through the plates 29a and 30 and through slots 35 in the ring 31.

A ball thrust bearing 36 is preferably interposed between the camming member and the fly wheel 2, and in order that the driving shaft may be started in the event that it stops, a lock up generally denoted by the reference numeral 37 has been attached to the fly wheel and the camming member, so that the rotation of the driven member may start the driving member as set forth in my co-pending application, Serial No. 644,229, filed November 25, 1932.

The friction plates or members 28 and 29 which cooperate with each other and with the fly wheel 2, are adapted to be initially engaged by means of centrifugal weights 38 one of which is shown. This centrifugal weight is shown as pivoted to a support 39. When the weight flies outwardly, a pair of studs 40 only one of which is shown movable with the weight engage a washer 41 slidably mounted upon a bolt 42 secured to the casing and compress a coil spring 43 surrounding the bolt with the result that the friction members will be initially compressed and caused to rotate with the fly wheel.

During the rotation of the fly wheel and friction members, the camming member 7 will cause the shifting of the cammed member for increasing the friction of the plates as previously set forth, the friction or braking segments coming into action during such shifting movement for regulating the shifting movement of said cammed member.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In an automatic clutch, a friction element, a camming member connected thereto, a cammed member adapted to be longitudinally shifted by said camming member, means including levers actuated by said cammed member for acting against said friction element and friction means between said members for controlling the shifting movements of said cammed member.

2. In an automatic clutch, a driving shaft having a fly wheel, a driven shaft coaxially supported with said driving shaft, a camming member loosely mounted upon said driving shaft, a friction element carried by said camming member for coaction with said fly wheel, a cammed member splined upon said driven shaft and adapted to be shifted longitudinally by said camming member and friction means between said camming member and cammed member.

3. In an automatic clutch, a driving shaft having a fly wheel, a driven shaft coaxially mounted in relation to the driving shaft, a camming member loosely mounted upon the driven shaft, friction elements carried by said camming member, a cammed member splined upon said shaft adapted for shifting movements by said camming member, said cammed member having a portion overhanging said camming member, friction means between said portion and said camming member, and means actuated by said cammed member for exerting pressure upon said friction elements.

4. In an automatic clutch, friction elements, centrifugal means for initially engaging said elements, means for increasing the frictional engagement of said elements including a pair of relatively rotatable and shiftable members and friction means between said members for controlling the relative shifting movements thereof.

5. In an automatic clutch, a driving shaft, a driven shaft mounted coaxially with the driving shaft, a camming member loosely mounted upon the driven shaft, friction elements carried by said member, a cammed member splined upon the driven shaft and adapted to be shifted by the camming member, said cammed member having an annular flange extending over a portion of the camming member, said flange having a shoulder, friction means between said flange and portion and in engagement with said shoulder and means actuated by said cammed member for exerting pressure against said friction elements.

KENNETH E. LYMAN.